United States Patent [19]

Felly

[11] Patent Number: 4,486,905
[45] Date of Patent: Dec. 11, 1984

[54] UNDERWATER FLOWER CUTTER

[76] Inventor: Albert H. Felly, 544 W. Washington Ave., Madison, Wis. 53703

[21] Appl. No.: 337,075

[22] Filed: Jan. 4, 1982

[51] Int. Cl.³ .............................................. A01G 3/00
[52] U.S. Cl. ................................................... 47/1 R
[58] Field of Search ........................ 47/1, 4, 6, 7, 8; 30/180, 124, 182, 241

[56] References Cited

U.S. PATENT DOCUMENTS

| | | |
|---|---|---|
| 706,481 | 10/1901 | Wilson . |
| 1,734,159 | 11/1929 | Dolan .................................. 47/1 X |
| 2,823,454 | 7/1957 | Kirchner ......................... 30/241 X |
| 3,041,725 | 7/1962 | Harries ................................. 30/180 |
| 3,056,267 | 10/1962 | McRee ................................. 61/53.5 |
| 3,177,584 | 4/1965 | Cockerill ............................. 30/228 |
| 3,509,706 | 5/1970 | McCutcheon et al. ............. 56/338 |
| 3,584,411 | 7/1969 | Broersma .............................. 47/6 X |
| 3,848,334 | 11/1974 | Mattera ............................... 30/180 |
| 3,922,780 | 12/1975 | Green ................................... 30/92 |
| 3,969,843 | 7/1976 | Wahler et al. ........................ 47/6 |
| 4,198,748 | 4/1980 | Lewis .................................. 30/180 |
| 4,348,832 | 9/1982 | Hauser .................................. 47/1 |

OTHER PUBLICATIONS

*How to Droop-Proof Your Blooms*, Sandra Erikson, NYM Corporation, New York, Mar. 7, 1977, p. 64.
*Industrial Hydraulics Manual*, Sperry Vickers, 1970, pp. 3-1, 3-10, 3-11, 6-3.
*Preservation and Freshness in Flowers*, The Art of Floral Designing, W. C. Harry at De La Mare Company, NY, 1930, pp. 126-131.

*Primary Examiner*—Robert A. Hafer
*Assistant Examiner*—Danton DeMille
*Attorney, Agent, or Firm*—Isaksen, Lathrop, Esch, Hart & Clark

[57] ABSTRACT

An underwater flower cutter for cutting flower stems is disclosed which is adapted from operation while submersed beneath water. The underwater flower cutter includes a reciprocating hydraulically operated knife which is capable of cutting the stems of flowers and which is operable from outside of the water. Flower stems can be inserted into the cutter and the hydraulic assembly operated from outside of the water to cleanly cut the stems of the flowers while they are submersed.

6 Claims, 3 Drawing Figures

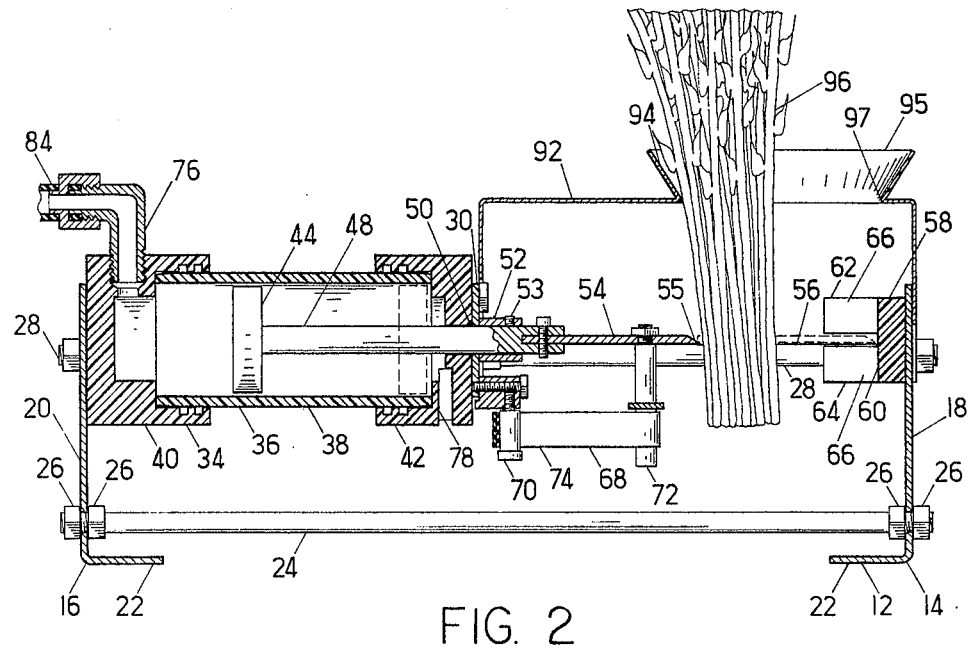
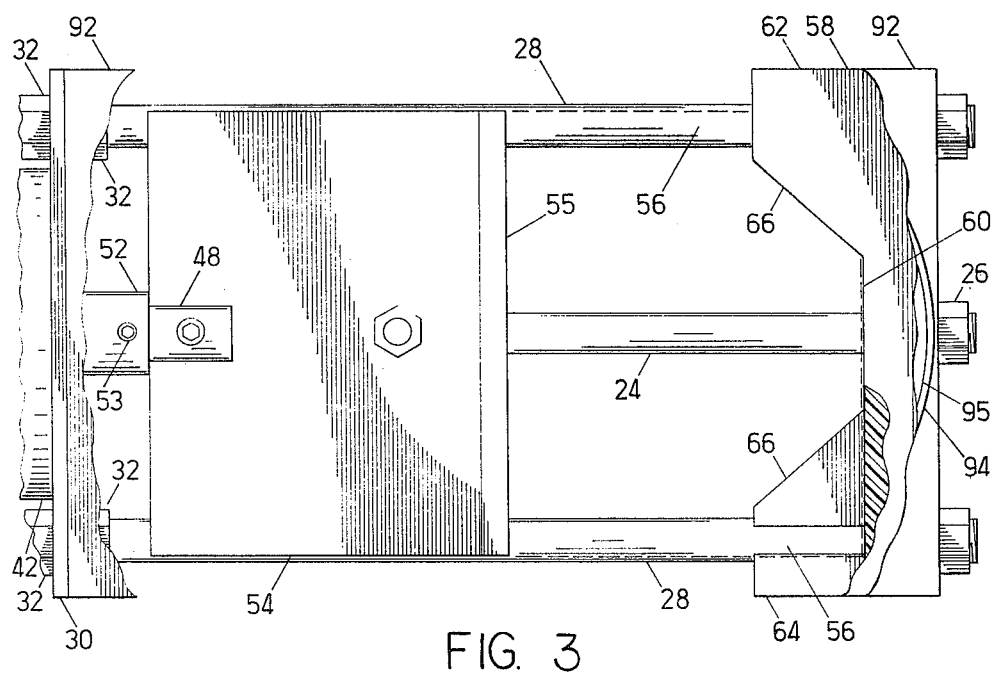

UNDERWATER FLOWER CUTTER

TECHNICAL FIELD

The present invention relates to flower cutters in general, and in particular, to cutters for underwater trimming of the stems of cut flowers.

BACKGROUND OF ART

The art of managing cut flowers so as to extend the period in which they appear fresh and natural includes so managing the cut portion of the stem that water and other materials may pass freely up the stem, entering the flower at the point at which the stem has been cut. It is known in the art that it is beneficial to recut the stems of cut flowers before placing them in water for holding.

Water containing a variety of dissolved substances flows up the stem of a flower before it is cut, and sugars and other materials move up the stem to the leaves and other sites of photosynthesis from the roots. The cells through which water is transmitted have water-transmitting end plates through which the water and various dissolved substances can pass with relative freedom.

When a flower stem is cut from the plant and exposed to the air, water continues to rise in the stem. As a consequence, a small bubble of air is drawn upward into the water-transmitting cells at the point of the cut. The bubble is held by the cell end plates and blocks the transmission of water up the stem when the cut flower is put into water. The sugars and other materials moving from the leaves toward the roots also continue to descend. They can be exuded on to the cut surface of the stem and be drawn back up into the water-conducting cells where they subsequently can crystalize and further block the flow of water. This effect can be aggravated by the prior presence of air in those cells. Thus, the flow of water important to maintaining the freshness of a flower may be interferred with by air or by sugar blockage or both.

It is known in the art that, in order to reduce the air and sugar blockage referred to above, it is beneficial to recut the stems of cut flowers to remove that part of the stem containing blocked cells. In order to avoid the formation of a new air bubble in the stem, it is known in the art to make the new cut while the end of the stem is immersed in water. Conventionally, florists use knives or shears to make the new cut while the stems are held under water contained in a pan or sink or under a stream of flowing water. The florist generally must hold the flowers in one hand and the cutting implement in the other, limiting the ease with which the flowers can be managed. The use of shears or a knife also generally requires the florist to immerse the hand holding the cutting implement. When the cutting operation is being undertaken in a cold room, significant operator discomfort may result. Furthermore, flower stems must be cut relatively few at a time when either a knife or shears are used, a special disadvantage when large numbers of flowers are being dealt with at a central distribution point or as part of the mass production of flower arrangements.

The prior art is cognizant of the use of hydraulic or pneumatic pistons to drive cutting knives in non-analogous applications. Examples include Cockerill, U.S. Pat. No. 3,177,584, Mattera, U.S. Pat. No. 3,848,334, and Green, U.S. Pat. No. 3,922,780. McRee, U.S. Pat. No. 3,056,267, shows a large-scale hydraulically driven cutter designed to be threaded over the upper ends of piles that have been driven into a river bottom, whereupon the cutter is lowered to the bottom of the water and hydraulically actuated to shear the pile at the mud line.

The prior art is also cognizant of air or hydraulically driven cutting implements for pruning or harvesting. Examples include Wilson, U.S. Pat. No. 706,481, Harries, U.S. Pat. No. 3,041,725, and McCutcheon, et al., U.S. Pat. No. 3,509,706. Lewis, U.S. Pat. No. 4,198,748, shows a hydraulically driven pruning device employing pressurized water as the hydraulic fluid.

The prior art makes no provision for a hydraulically driven flower stem cutter adapted for stationary operation while submersed beneath water, with the provision of guides and shields to ensure the safety of the operator and the convenient placement of an entire bundle of stems into the cutter. Furthermore, the prior art makes no provision for the remote operation of a stationary underwater cutter in such a manner that a single operator may have both hands available to him to guide and otherwise manipulate the stems to be cut. Nor does the prior art show a piston-driven cutter adapted to be used under water in an environment that must be kept free of grease and oil.

SUMMARY OF THE INVENTION

The present invention is summarized in that an underwater flower cutter for cutting flower stems, adapted for operation while submersed beneath water, includes a frame having a selected horizontal length, a hydraulic cylinder assembly supported by the frame at one end thereof and having a power shaft extending horizontally toward the other end of the frame, and an anvil attached to the frame at a point remote from the cylinder assembly and having an impact surface. A knife is attached to the power shaft and has a cutting edge adapted to be driven by movement of the shaft against the impact surface when pressurized water is introduced into the hydraulic cylinder assembly. The underwater flower cutter includes means for biasing the knife away from the anvil and also includes a valve adapted selectively to introduce pressurized water into the hydraulic system, causing the shaft to move and the cutting edge of the knife to be driven against the impact surface, whereupon the flower stems previously placed therebetween may be cut, and subsequently to allow pressurized water in the hydraulic cylinder assembly to be exhausted to permit the biasing means to draw the cutting edge away from the impact surface.

A primary object of the invention is to provide a means for cutting bundles of flower stems while they are submerged in water.

A second object of the invention is to provide such a means for cutting flower stems wherein both hands of the operator are free to manipulate the flowers being cut.

A further object of the invention is to provide a cutter that may be operated safely in a wet environment without any danger of electrical shock.

Another object of the invention is to provide for such a cutter that presents no danger of introducing oil or grease into the water in which it is submerged.

Yet another object of the invention is to provide a hydraulic cutter capable of being run on common commercial water supply pressures, thus requiring no special or unusual source of hydraulic pressure.

Yet another object of the invention is to provide such a cutter having a shield to increase the operator's safety as well as the ease with which flower stem ends may be directed into cutting position even in water which has been sufficiently cluttered with cut stem ends as to restrict visibility.

Other objects, features, and advantages of the invention will be apparent from the following detailed description taken in conjunction with the accompanying drawings showing a preferred embodiment of an underwater flower cutter made in accord with the invention.

BRIEF DESCRIPTION OF THE DRAWINGS

FIG. 2 is a section view of the underwater flower cutter of FIG. 1, taken along section lines 2—2, showing a bundle of flowers positioned for cutting.

FIG. 3 is a top view of a portion of the underwater flower cutter of FIG. 1 with parts of the shield broken away, showing the knife, anvil, and related parts thereof.

DETAILED DESCRIPTION OF THE PREFERRED EMBODIMENT

Figure 1:
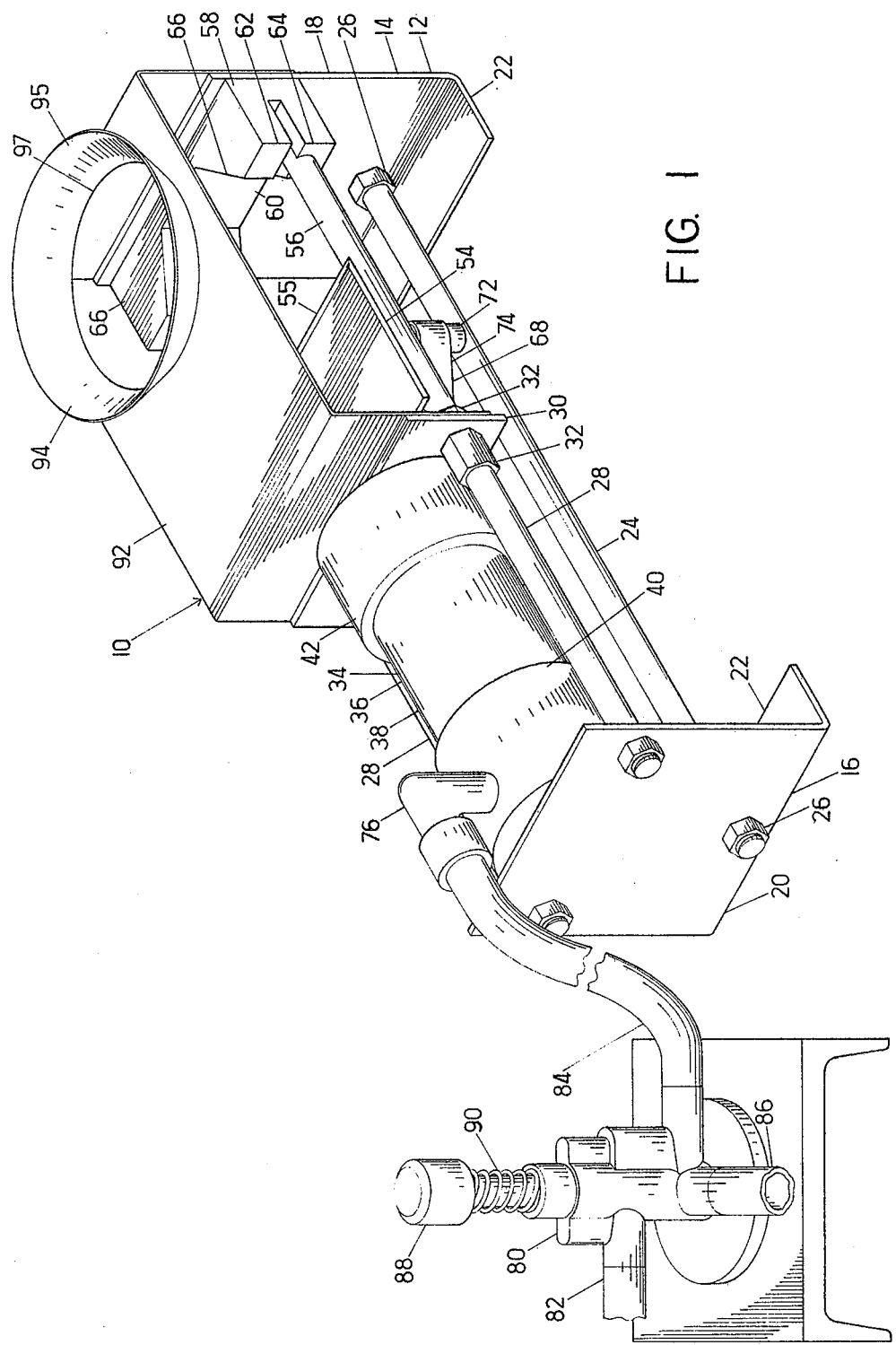
FIG. 1 is a perspective view of an underwater flower cutter, made in accord with the invention.

Referring more particularly to the drawings, wherein like numbers refer to like parts, FIG. 1 illustrates a preferred embodiment of the novel underwater flower cutter of the invention, shown generally at 10. The underwater flower cutter 10 has a substantially rigid frame 12. The frame 12 has an anvil end 14 and a piston end 16. The frame 12 has a first end plate 18 having a selected height and width located at the anvil end 14 of the frame. A second end plate 20 generally similar to the first end plate in size and shape is oriented in opposed relation thereto and is located at the piston end 16 of the frame 12. Each end plate 18, 20 has a foot portion 22 adapted to rest on the floor or other supportive surface of the water bath in which the underwater flower cutter 10 is being used and to thereby support the weight of the underwater flower cutter.

The frame 12 further includes a lower support bar 24 having a selected length and extending between the first end plate 18 and the second end plate 20. The lower support bar 24 is rigidly attached to each end plate 18, 20 by any conventional means for attachment. In the preferred embodiment, the end plates 18, 20 have holes (not shown) through which the lower support bar 24 extends. The ends of the lower support bar 24 are threaded, and nuts 26 are engaged with the threads and are tightened against the adjacent end plate 18, 20 to attach the bar 24 thereto.

Two upper support bars 28 extend between the first and second end plates 18, 20 at a selected distance above the lower support bar 24. The upper support bars 28 generally correspond to each other in structure and are spaced horizontally from each other at a selected distance. The ends of each upper support bar 28 are attached to the first and second end plates 18, 20 in a manner comparable to the mode of attachment of the lower support bar 24.

The frame 12 also includes a middle support plate 30 located at a selected point between the first and second end plates 18, 20. The middle support plate 30 extends at a right angle to the two upper support bars 28 and is rigidly attached thereto. Preferably, the middle support plate 30 has holes (not shown) through which the upper support bars 28 pass. The two upper support bars 28 have threads that extend for a selected distance on either side of the middle support plate 30. Nuts 32 threadedly engaged with the threads are turned tightly against opposite sides of the middle support plate (30), firmly holding the middle support plate between them.

An hydraulic cylinder assembly 34 extends between the second end plate 20 and the middle support plate 30 substantially parallel to the two upper support bars 28. The hydraulic cylinder assembly 34 has a piston housing 36, including a tubular portion 38 extending substantially parallel to the two support bars 28, a first end cap 40 closing the end of the tubular portion 38 adjacent to the second end plate 20 in substantially sealed relation, and a second end cap 42 closing the end of the tubular portion 38 adjacent to the middle support plate 30. A piston head 44 is contained within the tubular portion 38 and is adapted to move reciprocally therein between the first and second end caps 40, 42. A power shaft 48 is attached to the piston head 44. The second end cap 42 and the middle support plate 30 have surfaces defining a shaft port 50 extending therethrough parallel to the tubular portion 38. The power shaft 48 extends through the shaft port 50 toward the first end plate 18 for a selected distance.

An annular shaft collar 52 surrounds the shaft 48 at a selected location and is tightly fastened thereto by means of a set screw 53. The shaft collar 52 is so located on the shaft 48 that when the piston head 44 approaches the first end cap 40, the shaft collar 52 comes to rest against the middle support plate 30, as is illustrated in FIG. 2, thus preventing contact between the piston head and the first end cap.

A knife 54 is attached to the end of the shaft 48 that is remote from the piston head 44. The knife 54 extends horizontally to overlap and rest upon upwardly facing surfaces of the two upper support bars 28, which surfaces serve as knife guides 56 defining the lowermost level along which the knife can move. The knife 54 has a horizontally oriented cutting edge 55 that faces the first end plate 18.

An anvil 58 is attached to the first end plate 18. The anvil 58 has holes (not shown) through which the two upper support bars 28 extend. The anvil 58 has an impact surface 60 adapted to engage the cutting edge 55 of the knife 54 when the knife has slid along the knife guides 56 for a selected distance. The location of the impact surface 60 determines the furthest possible extension of the knife 54 and attached shaft 48 and piston head 44 toward the anvil end 14 of the frame 12. The anvil 58 also has upper and lower stem locator members 62, 64 extending for a selected distance from the impact surface 60 toward the piston end 16 of the frame 12. When the cutting edge 55 is in contact with the impact surface 60, the upper stem locator members 62 extend above the knife 54, and the lower stem locator members 64 extend beneath it. The lower stem locator members 64 are so located relative to the upper support bars 28 that the surfaces of the upper support bars 28 serving as knife guides 56 are unobstructed, as is best illustrated in FIG. 3. Each upper and lower stem locator member 62, 64 has a locator surface 66 extending laterally away from a selected point on the impact surface 60 toward the upper support bar 28 nearest thereto at an angle to the impact surface.

The underwater flower cutter 10 includes means 68 for biasing the knife 54 toward the piston end 16 of the frame 12. In the preferred embodiment, a stationary retractor post 70 is rigidly fastened to the middle support plate 30 midway between the two upper support bars 28 and extends downwardly for a selected distance. At least one and preferably two moving retractor posts 72 are attached to the knife 54, extending downwardly therefrom at selected locations between the two upper support bars 28. An elastomeric band 74, such as a large conventional rubber band, is fastened to both moving retractor posts 72 and is passed around the side of the stationary retractor post 70 facing toward the piston end 16 of the frame 12. The elastomeric band 74 has a length selected to be such that the band remains under moderate tension when the shaft collar 52 is in contact with the middle support plate 30, thus biasing the knife 54 toward the piston end 16 of a frame 12. Furthermore, because the stationary and moving retractor posts 70, 72 are located beneath the knife 54, the elastomeric band 74 also tends to pull the knife downwardly, biasing it against knife guides 56. While the elastomeric band 74 disclosed is the preferred biasing means 68, expansion springs or other means for biasing the knife 54 toward the piston end 16 of the frame 12 are possible and within the scope and spirit of the invention.

A water supply port 76 is located on the cylinder assembly 34, preferably at the first end cap 40, to admit water into the high pressure side of the piston housing 36 between the piston head 44 and the first end cap 40 to drive the piston head and attached power shaft 48 and knife 54 toward the anvil end 14 of the frame 12, until the knife contacts the impact surface 60 of the anvil 58. The second end cap 42 of the piston housing 36 has a water vent 78 extending therethrough to communicate between the interior of the low pressure side of the piston housing and the water in which the underwater flower cutter 10 is immersed. As the piston head 44 is moved toward and away from the anvil end 14 of the frame 12, water leaves and enters the piston housing 36 through the water vent 78, with water substantially filling that part of the piston housing located between the piston head 44 and the second end cap 42. The size of the water vent 78 is selected to be such that water flow in and out of the piston housing 36 is restricted and the movement of the piston head 44 is thereby damped.

A conventional three-way valve 80 is connected to a water supply line 82 that is connected to the water supply of the building in which the underwater flower cutter 10 is to be used. A feed line 84 communicates between the valve 80 and the water supply port 76. An exhaust line 86 communicates between the valve 80 and a drain (not shown). The valve 80 has a plunger 88 adapted to be conveniently operated by the foot or knee of the user of the underwater flower cutter 10, the plunger having an elevated position and a depressed position. The plunger 88 is biased towards the elevated position by a compression spring 90. When the plunger is depressed, the valve 80 puts the water supply line 82 and the feed line 84 in communication, thereby pressurizing the feed line and the piston housing 36, driving the piston head 44 and attached shaft 48 and knife 54 toward the anvil 58 until the cutting edge 55 rests against the impact surface 60, as is shown in phantom in FIGS. 2 and 3. When the plunger 88 is allowed to return to its elevated position, the valve 80 puts the feed line 84 in communication with the exhaust line 86, whereupon the biasing means 68 pulls the knife 54 away from the anvil 58 and causes the water that had been introduced from the water supply line 82 to pass back through the feed line 84 and be exhausted through the exhaust line 86. The movement of the piston head 44 and connected knife 54 to the anvil 58 and back in response to the application and release of water pressure by means of the manipulation of the valve 80 as disclosed shall hereinafter be referred to as a "cutting cycle."

A shield 92 is fastened to and extends between the first end plate 18 and the middle support plate 30. The shield 92 extends across the anvil 58 and knife 54 and above them at a selected distance, so that the knife 54 may freely pass beneath the shield as it is put through a cutting cycle. The shield 92 is of a size selected to be sufficient to prevent the accidental introduction of the operator's hand or finger between the anvil 58 and knife 54. A flower stem guide 94 is attached to the shield 92 and extends therethrough. The flower stem guide 94 includes a broad, upwardly opening funnel 95 having an open bottom 97 with a selected diameter sufficiently large that a selected bundle of flower stems 96 may be inserted therethrough until the stems project between the knife 54 and anvil 58 adjacent to the impact surface 60. The funnel shape of the flower stem guide 94 tends to direct the ends of the stems being introduced into the underwater flower cutter 10 to a proper position for cutting, as is illustrated by the bundle of flower stems 96 shown in FIG. 2.

In use, the underwater flower cutter 10 of the invention is immersed in water contained in a tub, sink, or other selected receptacle. The water supply line 82 is connected to the water supply of the building in which the underwater flower cutter 10 is to be used, and the valve 80 is placed so as to be convenient for manipulation, preferably by the operator's foot or knee. The operator then selects a bundle of flowers 96 to be cut under water for the reasons discussed above, inserting the end of the bundle through the flower stem guide 94 until the stems project between the knife 54 and anvil 58. The plunger 88 of the valve 80 is then depressed by the operator. As the knife 54 is driven toward the anvil 58 by the piston head 44 and power shaft 48, the stems are forced toward the stem locator surfaces 66 and the impact surface 60, and are cut by the cutting edge 55. After the knife 54 reaches the impact surface and the stems are all cut, the operator releases the plunger 88 and the knife 54 is returned to its starting position by the biasing means 68, thus completing the cutting cycle.

It will be appreciated that there can be no deleterious leakage of foriegn hydraulic fluid into the water under which the stems are being cut in that the propelling fluid is itself water. Consequently, no gasket is needed to seal the piston head 44 to the inner surfaces of the tubular portion 38 of the piston housing 36. The piston head 44 need only fit tightly enough to allow for a pressure differential before and behind the piston head sufficient to propel the knife 54 against the anvil 58 with enough force to cut the stems 96. Water leaking around the piston head 44 serves to lubricate the piston head, making grease or oil unnecessary, a feature that is beneficial in that oil or grease in the water bathing the stems 96 would foul the newly cut stem ends. It will also be appreciated that, even if the water in the tub or sink becomes cluttered by cut stem ends so that the operator's view of the knife 54 and anvil 58 becomes obstructed, the operator may nevertheless reliably and safely locate the stems 96 in a proper position between the knife and anvil and also may roughly gauge how far beyond the knife the stems extend prior to cutting by estimating downwardly from the flower stem guide 94, which may be allowed to protrude up to and even slightly above the surface of the water.

While the embodiment of the biasing means 68 shown is preferred, other equivalent biasing means including, by way of example, mechanical spring means or hydraulic means, may be employed. Typically, hydraulic means would be provided by a modified cylinder assembly of the conventional double acting type in which an additional water line is directed from a modified control valve to the other end of the cylinder, and the modified control valve alternately and oppositely connects the two lines to the water supply and the drain in a conventional manner to cause the piston to cycle between positions adjacent to the first end cap 40 and the second end cap 42. In such an arrangement, the drain part of the control valve would be suitably restricted to control the speed of movement of the piston. As in the preferred embodiment, leakage of water from the double-acting cylinder assembly would not contaminate the water bath in which the unit is submerged.

All rigid parts of the underwater flower cutter 10 of the invention may be conveniently made from appropriate metals (preferably non-corrosive in water) or plastics using conventional metal and plastic forming techniques. It is understood that the invention is not confined to the particular materials and embodiments herein illustrated and described but embraces all such modified forms thereof as come within the scope of the following claims.

What is claimed is:

1. An underwater flower cutter (10) for cutting flower stems (96), adapted for operation while submersed beneath water, comprising:
   (a) a frame (12) having a selected horizontal length;
   (b) an hydraulic cylinder assembly (34) supported underwater by the frame (12) at one end thereof and having a piston housing (36) with a water supply port (76) near one end thereof and a water vent (78) near the other end, the vent (78) permitting communication between the inside of the piston housing (36) and the surrounding water and being sized to control the rate of water flow between the interior of the piston housing and the surrounding water, a piston head (44) adapted to move reciprocally within the piston housing (36) with high pressure side facing the water supply port (76) and a low pressure side facing the water vent (78), and a power shaft (48) attached to the piston head (44) and extending horizontally beyond the housing toward the end of the frame remote from the hydraulic cylinder assembly;
   (c) an anvil (58) attached to the frame (12) and being supported underwater thereby at a point remote from the cylinder assembly (34), the anvil (58) having an underwater impact surface (60);
   (d) a knife (54) attached to the shaft (48) and having a cutting edge (55) adapted to be driven by movement of the power shaft (48) against the impact surface (60) when pressurized water is introduced into the hydraulic cylinder assembly (34);
   (e) means (68) for biasing the knife (54) away from the anvil (58); and
   (f) a valve (80) adapted selectively to introduce pressurized water into the hydraulic cylinder assembly (34) through the water supply port (76) thereby forcing the piston head (44) away from the water supply port (76), causing water to flow from inside the piston housing (36) through the water vent (78) at a controlled rate and causing the power shaft (48) to drive the cutting edge (55) of the knife (54) against the impact surface (60), whereupon flower stems (96) previously placed therebetween may be cut, and the valve also adapted to subsequently allow pressurized water in the hyraulic cylinder (34) to be exhausted through the water supply port (76) thereby allowing the biasing means (68) to withdraw the cutting edge (55) of the blade (54) from the impact surface (60) and force the piston head toward the water supply port, return movement of the piston head being controlled by the rate at which the surrounding water may be drawn into the piston housing (36) through the water vent (78).

2. The underwater flower cutter (10) specified in claim 1 including:
   (a) a shield (92) fastened to the frame (12) extending over the anvil (58) and knife (54) so that the knife (54) may freely pass beneath it; and
   (b) a flower stem guide (94) attached to the shield (92) and extending therethrough, the flower stem guide (94) including an upwardly opening funnel (95) having an open bottom (97) having a selected diameter sufficiently large that the flower stems (96) may be inserted therethrough, the funnel (95) being so oriented that the flower stems (96) inserted therethrough project between the knife (54) and the anvil (58) adjacent to the impact surface (60) when the cutting edge (55) is drawn away therefrom.

3. The underwater flower cutter (10) specified in claim 1 or claim 2 wherein the valve (80) is adapted for operation by a selected portion of the leg of an operator of the underwater flower cutter (10) at a point remote from the frame (12).

4. The underwater flower cutter (10) specified in claim 3 wherein the anvil (58) has upper and lower stem locator members (62, 64) extending for a selected distance from the impact surface (60) and vertically spaced so that, when the cutting edge (55) is in contact with the impact surface (60), the upper stem locator members (62) extend above the knife (54) and the lower stem locator members (64) extend beneath the knife (54), each upper and lower stem locator member (62, 64) having a locator surface (66) extending laterally away from a selected point on the impact surface (60) at an angle to the impact surface (60).

5. an underwater flower cutter (10) for cutting flower stems (96), adapted for operation while submersed beneath water, comprising:
   (a) a frame (12) having a selected horizontal length;
   (b) an hydraulic cylinder assembly (34) supported underwater by the frame (12) at one end thereof and having a power shaft (48) extending horizontally toward the other end of the frame (12), the hydraulic cylinder assembly (34) including a piston housing (36) and a piston head (44) adapted to move reciprocally within the piston housing (36), a water supply port 76 near one end of the piston housing and a water vent (78) near the other end of the piston housing, the piston head (44) having a selected size such that when pressurized water is introduced into the hydraulic cylinder assembly (34) through the water supply port (76) a selected amount of water passes between the piston head (44) and the piston housing (36) to lubricate the piston head, and the water vent (78) being sized to control the rate of water flow between the interior of the piston housing and the surrounding water as the piston head reciprocates;

(c) an anvil (58) attached to the frame (12) and supported underwater thereby at a point remote from the cylinder assembly (34), the anvil (58) having an underwater impact surface (60);

(d) a knife (54) attached to the shaft (48) and having a cutting edge (55) adapted to be driven by movement of the power shaft (48) through the water and against the impact surface (60) when pressurized water is introduced into the hydraulic cylinder assembly (34) through the water supply port (76);

(e) upper and lower stem locator members (62, 64) extending for a selected distance from the impact surface (60) of the anvil (58) and vertically spaced so that, when the cutting edge (55) is in contact with the impact surface (60) the upper stem locator members (62) extend above the knife (54) and the lower stem locator members (64) extend beneath the knife (54), each upper and lower stem locator member (62, 64) having a locator surface (66) extending laterally away from a selected point on the impact surface (60) at an angle to the impact surface (60);

(f) means (68) for biasing the knife (54) away from the anvil (58);

(g) a valve (80) adapted for operation by a selected portion of the leg of an operator of the underwater flower cutter (10) at a point remote from the frame (12) and adapted selectively to introduce pressurized water into the hydraulic cylinder assembly (34) through the water supply port (76) thereby forcing the piston head (44) away from the water supply port (76), causing water to flow from inside the piston housing (36) through the water vent (78) at a controlled rate and causing the power shaft (48) to drive the cutting edge (55) of the knife (54) through the water and against the impact surface (60), the valve also adapted to subsequently allow pressurized water in the hydraulic cylinder (34) to be exhausted through the water supply port (76) thereby allowing the biasing means (68) to withdraw the cutting edge (55) of the blade (54) from the impact surface (60) and forcing the piston head (46) toward the water supply port, the return movement of the piston head being controlled by the rate at which the surrounding water may be drawn into the piston housing through the water vent (78);

(h) a shield (92) fastened to the frame (12) extending over the anvil (58) and knife (54) so that the knife (54) may freely pass beneath it; and (i) a flower stem guide (94) attached to the shield (92) and extending therethrough, the flower stem guide (94) including an upwardly opening funnel (95) having an open bottom (97) having a selected diameter sufficiently large that the flower stems (96) may be inserted therethrough, the funnel (95) being so oriented that the flower stems (96) inserted therethrough project between the knife (54) and the anvil (58) adjacent to the impact surface (60) when the cutting edge (55) is drawn away therefrom.

6. An underwater flower cutter (10) for cutting flower stems (96), utilizing a source of pressurized water, and adapted for operation while submersed beneath water, comprising:

(a) a frame (12) having a selected horizontal length;

(b) an hydraulic cylinder assembly (34) supported underwater by the frame (12) at one end thereof and having a piston housing (36) with a water supply port (76) near one end thereof and a water vent (78) near the other end, the vent (78) permitting communication between the inside of the piston housing (36) and the surrounding water and being sized to control the rate of water flow between the interior of the piston housing and the surrounding water, a piston head (44) adapted to move reciprocally within the piston housing (36) with a high pressure side facing the water supply port (76) and a low pressure side facing the water vent (78), the piston head (44) having a selected size such that, when pressurized water is introduced into the hydraulic cylinder assembly (34), a selected amount of water passes between the piston (44) and the piston housing (36), lubricating the piston head (44) and thereafter exhausting into the surrounding water, and a power shaft (48) attached to the piston head (44) and extending horizontally beyond the housing toward the end of the frame remote from the hydraulic cylinder assembly;

(c) an anvil (58) attached to the frame (12) and being supported underwater thereby at a point remote from the cylinder assembly (34) the anvil (58) having an underwater impact surface (60);

(d) a knife (54) attached to the shaft (48) and having a cutting edge (55) adapted to be driven by movement of the power shaft (48) against the impact surface (60) when pressurized water is introduced into the hydraulic cylinder assembly (34);

(e) means (68) for biasing the knife (54) away from the anvil (58); and (f) a valve (80) adapted selectively to introduce pressurized water into the hydraulic cylinder assembly (34) through the water supply port (76) thereby forcing the piston head (44) away from the water supply port (76), causing water to flow from inside the piston housing (36) through the water vent (78) at a controlled rate and causing the power shaft (48) to drive the cutting edge (55) of the knife (54) against the impact surface (60), whereupon flower stems (96) previously placed therebetween may be cut, and the valve also adapted to subsequently allow pressurized water in the hydraulic cylinder (34) to be exhausted through the water supply port (76) thereby allowing the biasing means (68) to withdraw the cutting edge (55) of the blade (54) from the impact surface (60) and force the piston head toward the water supply port, return movement of the piston head being controlled by the rate at which the surrounding water may be drawn into the piston housing (36) through the water vent (78).

* * * * *